(12) United States Patent
Hwang et al.

(10) Patent No.: US 10,766,379 B2
(45) Date of Patent: Sep. 8, 2020

(54) CHARGING APPARATUS FOR VEHICLE

(71) Applicants: Hyundai Motor Company, Seoul (KR); Kia Motors Corporation, Seoul (KR)

(72) Inventors: In Hwang, Hwaseong-si (KR); SoYeon Park, Seoul (KR); ByungJoo Lee, Seoul (KR); Kiwon Kim, Hwaseong-si (KR); Byounghaan Choi, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 411 days.

(21) Appl. No.: 15/804,926

(22) Filed: Nov. 6, 2017

(65) Prior Publication Data
US 2018/0334052 A1    Nov. 22, 2018

(30) Foreign Application Priority Data

May 18, 2017   (KR) ........................ 10-2017-0061557

(51) Int. Cl.
| | |
|---|---|
| *H02J 7/00* | (2006.01) |
| *B60L 58/12* | (2019.01) |
| *H01R 13/717* | (2006.01) |
| *H01R 13/502* | (2006.01) |
| *H01R 13/70* | (2006.01) |
| *H01R 13/52* | (2006.01) |
| *H01R 13/703* | (2006.01) |
| *B60L 53/16* | (2019.01) |
| *B60L 1/14* | (2006.01) |

(52) U.S. Cl.
CPC ................. *B60L 58/12* (2019.02); *B60L 1/14* (2013.01); *B60L 53/16* (2019.02); *H01R 13/502* (2013.01); *H01R 13/5213* (2013.01); *H01R 13/70* (2013.01); *H01R 13/703* (2013.01); *H01R 13/717* (2013.01); *H02J 7/0047* (2013.01); *H01R 2201/26* (2013.01); *H02J 7/0048* (2020.01); *H02J 7/0049* (2020.01)

(58) Field of Classification Search
USPC ......................................................... 320/109
See application file for complete search history.

(56) References Cited

U.S. PATENT DOCUMENTS

| | | | |
|---|---|---|---|
| 8,134,334 | B2 | 3/2012 | Suzuki et al. |
| 9,197,072 | B2 | 11/2015 | Umeda et al. |
| (Continued) | | | |

FOREIGN PATENT DOCUMENTS

| | | |
|---|---|---|
| CN | 103560549 A | 2/2014 |
| CN | 204668650 U | 9/2015 |
| CN | 205737199 U | 11/2016 |

*Primary Examiner* — Samuel Berhanu
(74) *Attorney, Agent, or Firm* — Morgan, Lewis & Bockius LLP (57) ABSTRACT

A charging apparatus for a vehicle includes a housing accommodating a charging portion, a case mounted to the housing, a PCB disposed inside the case and having a light source, a light guide plate configured to guide light emitted from the light source, a reflection plate configured to reflect the light through the light guide plate, a lens coupled to the case to form a region for accommodating the light guide plate and the reflection plate, and a cover hinged to the housing to open or close the housing.

18 Claims, 10 Drawing Sheets

(56) References Cited

U.S. PATENT DOCUMENTS

| | | | |
|---|---|---|---|
| 2008/0290668 A1* | 11/2008 | Ieda | B60R 25/24 |
| | | | 292/198 |
| 2010/0246198 A1* | 9/2010 | Hook | B60Q 1/2661 |
| | | | 362/459 |
| 2011/0043355 A1* | 2/2011 | Chander | B60K 15/05 |
| | | | 340/455 |
| 2014/0042966 A1* | 2/2014 | Masuda | B60L 53/22 |
| | | | 320/109 |
| 2016/0016020 A1* | 1/2016 | Sieber | A62B 7/10 |
| | | | 128/205.12 |

* cited by examiner

CHARGING APPARATUS FOR VEHICLE

CROSS-REFERENCE(S) TO RELATED APPLICATIONS

The present application claims priority to Korean Patent Application No. 10-2017-0061557, filed on May 18, 2017, the entire contents of which is incorporated herein by reference.

BACKGROUND OF THE INVENTION

Field of the Invention

The present invention relates to a charging apparatus for a vehicle including an improved indicator device configured to easily identify the state of charge of the vehicle.

Description of Related Art

Generally, a vehicle is a machine that moves along a road by driving a wheel. The vehicle may include an internal combustion engine (conventional engine vehicles) configured to generate mechanical power by burning oil (petroleum) fuels including gasoline or diesel to travel on a road using the mechanical power, and eco-friendly vehicles travel on a road using electricity as a power source to improve fuel efficiency and reduce the amount of discharged harmful emissions.

Eco-friendly vehicles include an electric vehicle and a hybrid vehicle. The electric vehicle may include a motor and a rechargeable battery as a power source, may rotate the motor using the power of the rechargeable battery, and may drive the wheels using the rotation of the motor. Meanwhile, the hybrid vehicle may include an engine, a battery, and a motor, and may travel on the road using the mechanical power of the engine and electric power of the motor.

Generally, an eco-friendly vehicle is a vehicle that uses energy stored in a battery as a power source, the battery is usually recharged by charging before discharging because a battery discharges when used for a certain time period, and when the battery is discharged, the vehicle may not be able to travel.

To this end, the eco-friendly vehicle is provided with an inlet used to charge the battery of the vehicle with an external power source, a plurality of terminals including a power terminal, a signal terminal, and a ground terminal are fixedly connected to the inlet while being connected to an electronic cable.

The motor operates as a motor when power is supplied from the battery, and operates as a generator during braking of the vehicle to convert regenerative energy generated during braking of the vehicle into electrical energy and supply the charging voltage to the battery.

The charging of the eco-friendly vehicle includes a fast charging method and a standard charging method. The fast charging method refers to generating the electrical energy required for re-driving by charging the battery within a short time period while parking the vehicle for a while, and the standard charging method refers to charging the battery in a garage after driving to completely charge the battery and end the charging state at 100% capacity.

A wired outlet disposed in a parking lot, a charging station, or the like can be used to charge the battery of an eco-friendly vehicle. When the wired outlet is connected to a battery inlet of the vehicle, the vehicle may receive power from the battery, and may charge the battery with the received power.

When the charging of the eco-friendly vehicle is completed, the user recognizes that the charging is completed by a charging completion indication displayed on a substrate within the vehicle; however, the charging completion indication is not easily displayed to the driver's view in an underground or in a dark environment.

Accordingly, to grasp the situation, the user is required to verify the electric power is charged to the eco-friendly vehicle through a control box, or to enter the internal of the vehicle to verify the electric power is charged to the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a charging apparatus for a vehicle configured to arrange an indicator device to perform a lighting function according to a charging portion of the vehicle.

Various aspects of the present invention are also directed to providing a charging apparatus for a vehicle improved wherein an indicator device emits light differently depending when the vehicle is being charged and when the charging of the vehicle is completed.

In accordance with an aspect of the present invention, a charging apparatus for a vehicle includes a housing accommodating a charging portion, a case mounted to the housing, a Printed Circuit Board (PCB) accommodated inside the case and having a light source, a light guide plate disposed to guide light emitted from the light source, a reflection plate disposed to reflect the light through the light guide plate, a lens coupled to the case to form a region for accommodating the light guide plate and the reflection plate, and a cover hinged to the housing to open or close the housing.

The charging apparatus for a vehicle may further include a switch disposed in the housing configured to transmit an electrical signal to the PCB, and a hinge pin inserted into the housing to turn on or off the switch by being interlocked with the opening or closing of the cover.

The hinge pin may include an interference portion disposed to one side of the hinge pin to interfere with the switch, and the switch may include a push portion disposed to one side of the switch to press an operation button of the switch by the interference portion.

The light source is illuminated when the switch is turned on by opening the cover, and is extinguished when the switch is turned off by closing the cover.

When the charging portion is being charged and the charging of the charging portion is completed, the color of the light source is differently emitted.

When an abnormality occurs in the charging of the charging portion, the light source blinks.

The light guide plate may include a pattern formed on the surface of the light guide plate wherein the light incident from the light source is uniformly transmitted.

The reflection plate covers a portion of the light guide plate wherein a lighting area and a non-lighting area are separated.

The reflection plate covers the upper surface, the external side surface and a portion of a lower surface of the light guide plate wherein the non-lighting area is partitioned.

The lens may include a light diffusing agent mixed resin.

The lens and the case are coupled by ultrasonic welding to waterproof the accommodating region inside the lens and the case.

The lens is disposed to cover the charging portion and is separated apart from the charging portion.

The light source may include a plurality of LED light sources disposed at both end portions of the PCB.

In accordance with an aspect of the present invention, a charging apparatus for a vehicle includes a cover hinged to a housing, an indicator device having an arc shape with both end portions distanced apart and disposed in the housing, a switch configured to transmit an electrical signal to the indicator device wherein the indicator device performs a lighting function, and a hinge pin configured to emit the light of the indicator device by turning on the switch and being interlocked with the opening of the cover, wherein the indicator device may include a light source to emit the light of different colors depending on when the vehicle is being charged and when the charging of the vehicle is completed, and a lens disposed to protect the light source.

The indicator device may further include a light guide plate including a pattern formed on the surface of the light guide plate to uniformly guide the light emitted from the light source, and a reflection plate to cover a portion of the light guide plate to partition a lighting area which the light emitted through the light guide plate reaches.

The present invention may enable the user to easily recognize the state of charge by controlling the lighting of an indicator device based on the state of charge.

The present invention may enable the user to easily recognize the state of charge and to maximize the visibility of an indicator by emitting different light colors of a light source, depending on the state of charging, that is, during charging or completion of charging.

The present invention may improve the convenience and stability of the charging and the reliability of the product, by arranging an indicator device near a charging portion.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invent throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Further, unless the context clearly indicates otherwise, singular expressions should be interpreted to include plural expressions. It should be understood that the terms "comprises," "comprising," "includes" or "has" are intended to indicate the presence of features, numerals, steps, operations, elements and components described in the specification or the presence of combinations of these, and do not preclude the presence of one or more other features, numerals, steps, operations, elements and components, the presence of combinations of these, or additional possibilities.

Also, the terms including ordinal numbers including "first," "second," etc. can be used to describe various components, but the components are not limited by those terms. The terms are used merely for distinguishing one component from another.

For example, a first component may be referred to as a second component, and similarly, a second component may be referred to as a first component without departing from the scope of rights of the invention. The term "and/or" encompasses combinations of a plurality of items or any one of the plurality of items.

Meanwhile, the terms "front end," "rear end," "upper portion," "lower portion," "upper end" and "lower end" used in the following description are defined based on the drawings, but a shape and a location of each element are not limited by those terms.

Hereinafter, exemplary embodiments according to an exemplary embodiment of the present invention will be described in detail with reference to the accompanying drawings.

Figure 1:
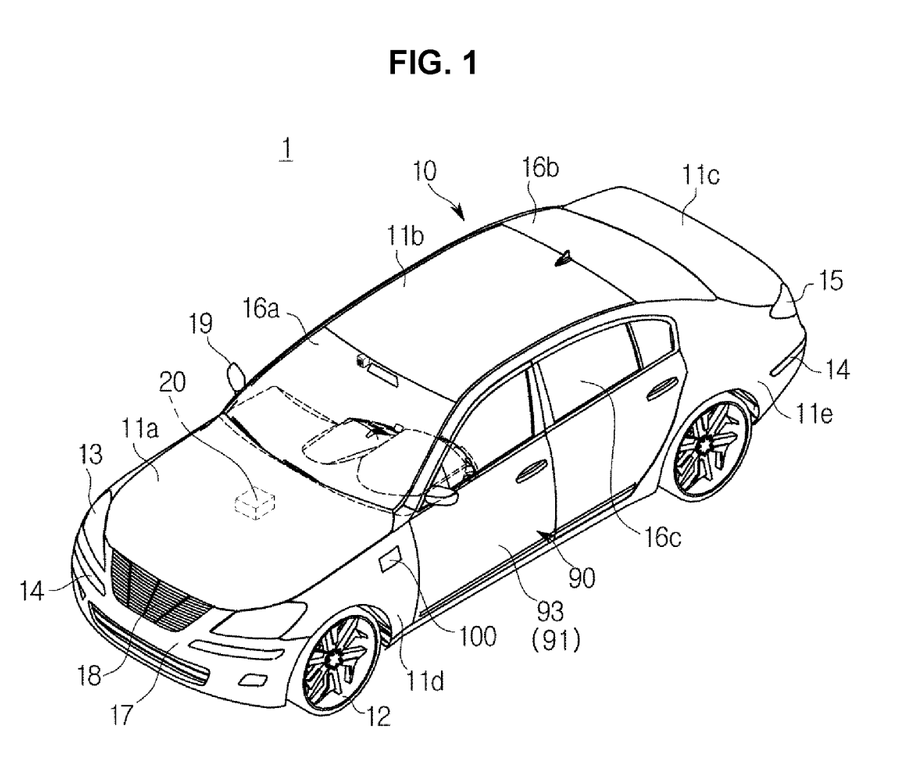
FIG. 1 is a view showing the appearance of a vehicle including a charging apparatus according to exemplary embodiments of the present invention.

FIG. 1 is a view showing the appearance of a vehicle including a charging apparatus for a vehicle according to exemplary embodiments of the present invention.

As shown in FIG. 1, a vehicle 1 may include a vehicle body 10 forming the external appearance of the vehicle 1, and a plurality of wheels 12 configured to move the vehicle 1.

The vehicle 1 herein refers to a machine that transports people, animals, and/or cargo from a starting place to a destination. The vehicle 1 may include cars that run on a road or track, ships that travel in an ocean or river, and airplanes that fly in the air with aeromechanics.

The vehicle 1 that runs on the road or track may travel in a desired direction by the rotation of at least one of the wheels 12, and may include two-wheeled, three-wheeled, or four-wheeled automobiles, cars for construction and machinery, two-wheeled vehicles, motorbikes, or trains that run on a track.

The vehicle 1 according to an exemplary embodiment of the present invention is an eco-friendly vehicle that travels using a battery and a motor, and may include an electric vehicle or a plug-in hybrid electric vehicle (PHEV).

The hybrid vehicle may travel in an electric vehicle (EV) mode in which power of the motor is only used, or may travel in a hybrid electric vehicle (HEV) mode in which power of the engine and power of the motor are used. The hybrid vehicle may also perform a regenerative braking (RB) mode in which braking energy or inertial energy is recovered through electric generation of the motor during braking or coasting caused by inertia to charge the battery.

The hybrid vehicle may control a starter generator configured to operate as a generator by the engine power, and may control the starter generator to operate as a generator by power delivered through the engine in an energy regenerative mode wherein the battery can be charged.

When the battery of the vehicle is charged, the energy input/output management of the main power source may be managed by current detection device disposed to an output terminal of the main battery, and the information related to the detected current value may be managed by analysis in a battery management system (hereinafter referred to as 'BMS').

The vehicle body 10 may include a hood 11a to protect various devices including an engine required for driving the vehicle 1, a loop or roof panel 11b forming the internal compartment of the vehicle 1, a trunk lid 11c to provide a storage compartment, and front fenders 11d and quarter panels 11e disposed at both sides of the vehicle 1.

Also, a plurality of doors 90 are hingedly coupled with the vehicle body 10 and may be disposed at both sides of the vehicle body 10. A door panel 91 may include a door external panel 93 forming the external of the vehicle 1.

A front window 16a configured to provide a view toward the front of the vehicle 1 may be disposed between the hood 11a and the loop panel 11b, and a rear window 16b configured to provide a view to the back of the vehicle 1 may be disposed between the loop panel 11b and the trunk lid 11c.

Also, a plurality of side windows 16c configured to provide a view to the sides of the vehicle 1 may be disposed at the upper portions of the doors 90.

A plurality of headlamps 13 configured to emit light in a heading or forward moving direction of the vehicle 1 may be disposed at the front portion of the vehicle 1. A plurality of turn signal lamps 14 configured to indicate a movement direction of the vehicle 1 may be disposed at the front and back portions of the vehicle 1.

A plurality of tail lamps 15 may be disposed at the back portion of the vehicle 1 to indicate a gear shifting state, a brake operation state, etc. of the vehicle 1.

The vehicle body 10 may include a front bumper 17 and a radiator grille 18. A side mirror 19 configured to monitor the rear end portion of the vehicle 1 may be disposed at the doors 90.

In the inside or internal of the vehicle 1, at least one controller 20 may be disposed. The controller 20 may perform electronic control related to operations of the vehicle 1. The controller 20 may be disposed at an arbitrary internal location of the vehicle 1 according to a designer's selection.

The controller 20 may include at least one processor configured to receive electrical signals, to process the received electrical signals, and then output the processed signals.

The at least one processor may be implemented with at least one semiconductor chip and related components. The at least one semiconductor chip and the related components may be mounted on a Printed Circuit Board (PCB) that can be disposed in the internal of the vehicle 1.

The vehicle 1 may include a charging apparatus 100 to charge the fuel of the vehicle 1. The charging apparatus 100 may be disposed in the front fenders 11d, but the present invention is not limited thereto, and disposed at any position of the vehicle body 10 to the extent that an outlet to charge the vehicle 1 is inserted.

For example, the charging apparatus 100 may be disposed in the quarter panels 11e.

Figure 2:
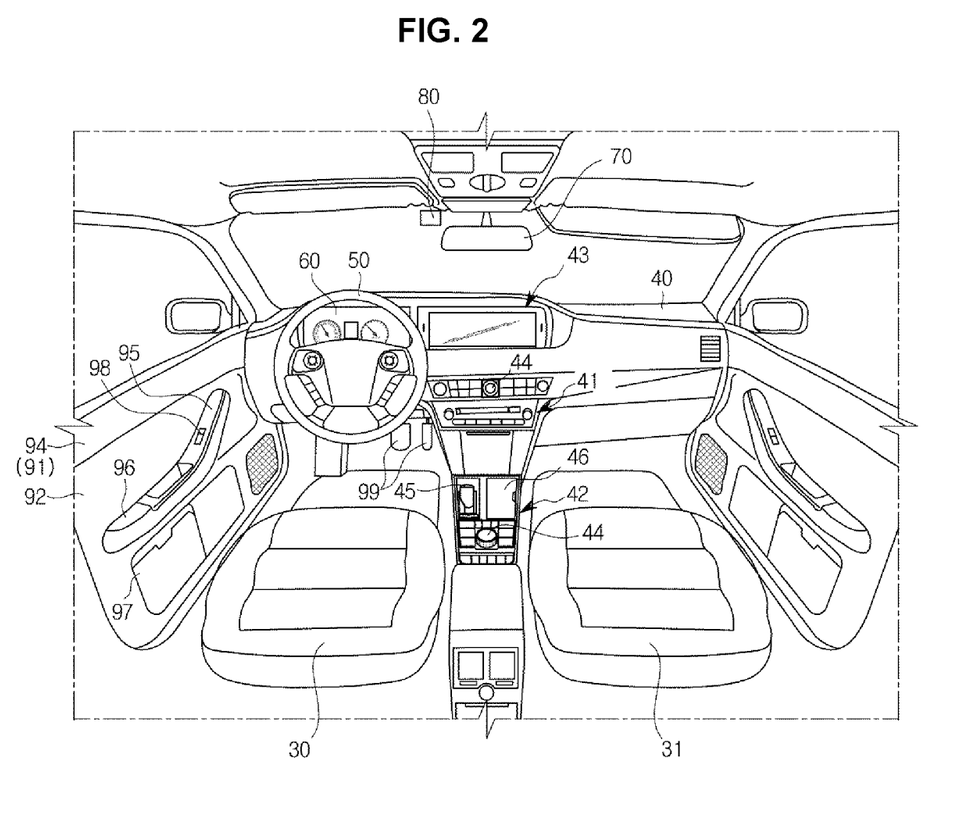
FIG. 2 is a view showing an internal structure of a vehicle including a charging apparatus according to exemplary embodiments of the present invention.

FIG. 2 is a view showing an internal structure of a vehicle including a charging apparatus for a vehicle according to exemplary embodiments of the present invention.

As shown in FIG. 2, a driver's seat 30 and an passenger's seat 31 may be disposed in the internal of the vehicle 1. A dashboard 40, a steering wheel 50, and an instrument panel 60 may be disposed in the internal of the vehicle 1.

The dashboard 40 may refer to an indoor panel which partitions an internal of the vehicle 1 from an engine compartment and in which various components needed for vehicle operations are disposed.

The dashboard 40 may be deposed in front of the driver's seat 30 and the assistant's seat 31. The dashboard 40 may include an upper panel, a center fascia 41 and a gear box 42.

A display device 43 may be disposed on the upper panel of the dashboard 40. The display device 43 may provide various information to the driver or passenger of the vehicle 1 as an image.

Various types of devices, including a processor, a communication device, a satellite navigation device receiving device, and a storage device, may be disposed inside the dashboard 40.

The processor disposed in the vehicle 1 may be configured to control various electronic devices disposed in the vehicle 1, and may be configured to perform the functions of the controller 20 as described above.

The devices described above may be implemented using various components including a semiconductor chip, a switch, an integrated circuit, a resistor, a volatile or non-volatile memory, or a printed circuit board, etc.

The center fascia 41 may be disposed at the center of the dashboard 40, and an input device 44 may be disposed at the center fascia 41 to input various commands related to the vehicle 1.

The gear box 42 is located at the lower portion of the center fascia 41 and may be disposed between the driver's seat 30 and the passenger's seat 31. On the gear box 42, a gear 45 and a storage box 46 may be disposed.

The steering wheel 50 is configured to be rotated in a predetermined direction in accordance with the operations of the driver, and the vehicle 1 may be steered by the rotation of the wheels 12 of the vehicle 1 in accordance with the rotational direction of the steering wheel 50.

The instrument panel 60 may be configured to provide the driver various types of information related to the vehicle 1, including a driving speed, Revolutions Per Minute (RPM), an amount of remaining fuel, a temperature of the engine oil, activation of the turn signal lamp 14, and a traveled distance of the vehicle 1.

A rear-view mirror 70 may be disposed at an upper portion of the internal of the vehicle 1, and the driver may view the internal or the rear of the vehicle 1 by the rear-view mirror 70.

At least one photographing device 80 may be disposed in the internal of the vehicle 1. The photographing device 80 may photograph a surrounding image of the vehicle 1 while the vehicle 1 is running or stopping, and may acquire positional information related to a preceding vehicle located in front of the vehicle 1.

The doors 90 may include the door panel 91 forming an external of the vehicle 1, and a door trim 92 mounted at the internal of the door panel 91.

The door panel 91 may include a door internal panel 94 disposed opposite to the door external panel 93 while facing the internal of the vehicle 1.

The door trim 92 may have functions of sound insulation, sound absorption, and protect passengers when a crash occurs, as well as for internal decoration. An internal handle configured to open the doors 90 and a pull handle 95 configured to pull and close the doors 90 may be disposed on the internal surface of the door trim 92.

In addition, an arm rest 96 and a door pocket 97 may be disposed at the door trim 92. Various switches 98, including a window opening or closing switch, a door locking and unlocking switch, and a side mirror control switch, may be disposed at the door trim 92.

A garnish, a molding, or the like may be attached to an external surface of the door panel 91 for making the external elegant, reinforcing the strength of the door panel 91, or enhancing user convenience. In addition, the garnish, a molding, or the like may also be attached to the door trim 92 for internal decoration of the vehicle 1.

The door 90 may include a door guard disposed at the edge portion of the door 90 configured to prevent damage to the doors of other vehicles that come into contact with the vehicle when the door 90 is opened.

The vehicle 1 may include various pedals 99 including an accelerator pedal to accelerate the vehicle 1, a brake pedal to stop the vehicle 1, and a clutch pedal to shift the speed of the vehicle 1.

Figure 3:
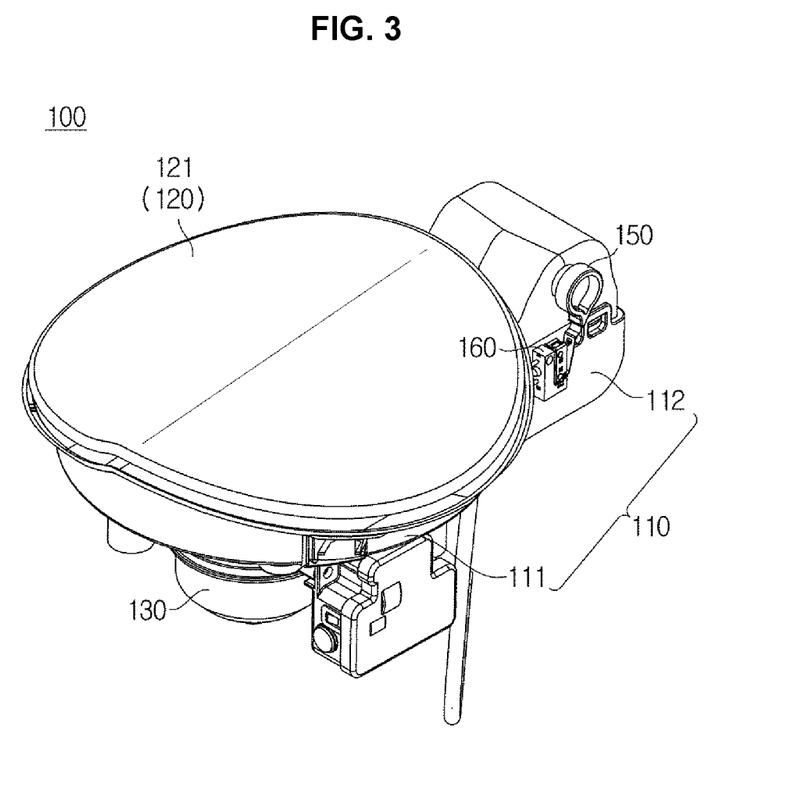
FIG. 3 is a perspective view of a charging apparatus for a vehicle according to exemplary embodiments of the present invention.
Figure 4:
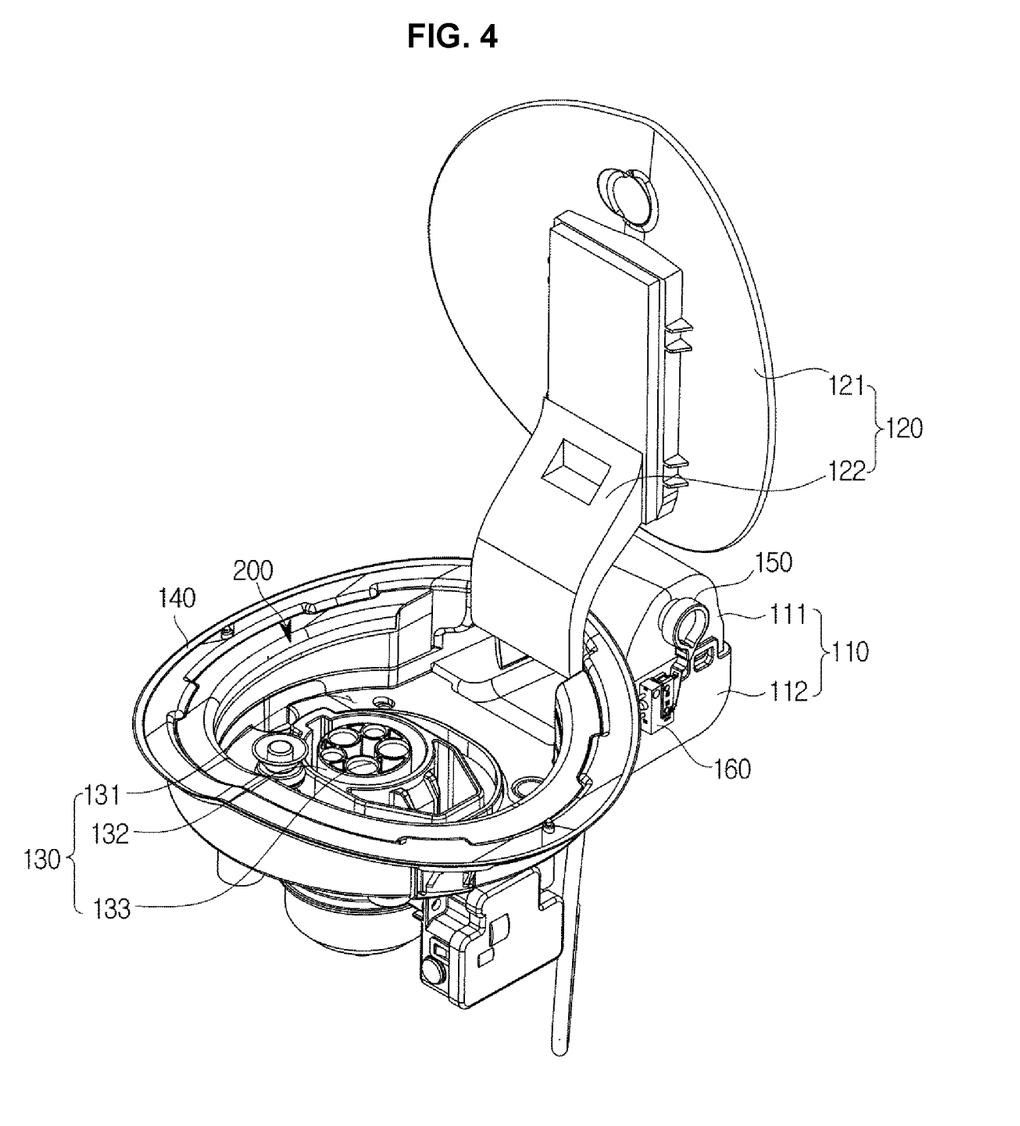
FIG. 4 is a view showing a state in which a cover of a charging apparatus for a vehicle according to exemplary embodiments of the present invention is opened.

FIG. 3 is a perspective view of a charging apparatus for a vehicle according to exemplary embodiments of the present invention. FIG. 4 is a view showing a state in which a cover of a charging apparatus for a vehicle according to exemplary embodiments of the present invention is opened.

As shown in FIG. 3 and FIG. 4, the charging apparatus 100 according to an exemplary embodiment of the present invention may include a housing 110 configured to accommodate a charging portion 130.

The housing 110 may accommodate the charging portion 130 and include a first housing 111 configured to function as an upper cover of a region to accommodate a control device 270, and a second housing 112 configured to function as a lower case of a region to accommodate the control device 270.

The charging apparatus 100 may include a cover 120 hinged to the housing 110 configured to open or close the housing 110. The cover 120 may be hinged to the first housing 111.

The charging portion 130 disposed inside the housing 110 may be protected by the cover 120. The cover 120 may include a first cover 121 configured to cover the internal region of the housing 110, and a second cover 122 configured to connect the first cover 121 and the housing 110.

The charging apparatus 100 may include a switch 160 disposed on the housing 110 and configured to transmit an electrical signal to an indicator device 200, and a hinge pin 150 inserted into the housing 110 to turn on or off the switch 160 by being interlocked with the opening or closing of the cover 120.

The switch 160 may be disposed to a first side external to the housing 110 and interacts with the hinge pin 150 by opening or closing operations of the cover 120.

The second cover 122 may have a gooseneck shape and be coupled to the first cover 121 and the one end portion of the second cover 122 may be connected to the hinge pin 150. The second cover 122 may connect the first cover 121 and the hinge pin 150 to rotate the hinge pin 150 by being interlocked with the opening or closing operation of the first cover 121.

A detailed description of the switch 160 operated in conjunction with the opening or closing operation of the cover 120 is given below.

The charging apparatus 100 may include a louver 140 including a rubber material configured to enhance a coupling force between the cover 120 and the housing 110. The louver 140 may be formed by vacuum forming a ThermoPlastic Elastomer (TPE) material.

The power device of the vehicle 1 may include a power generating device and a power transmitting device. In the case of an electric vehicle, the power generating device may include a battery and a motor.

In the case of a hybrid vehicle, the power generating device may include a battery, a motor, an engine, a fuel device, a cooling device, and a fuel supply device.

The battery may be a main battery that generates a high-voltage current and supplies a driving force to the vehicle 1. The motor may convert the electrical energy of the battery into mechanical energy to operate various devices provided in the vehicle.

In the case of the hybrid vehicle, the vehicle 1 may operate the motor when a start button is turned on, and drive the engine by the operation of the motor. The hybrid vehicle may be a plug-in hybrid vehicle that charges the battery using external power.

In the case of an electric vehicle, the vehicle may allow the motor to generate a maximum torque by supplying a maximum current to the motor when the start button is turned on.

The power transmitting device may include at least one of a clutch, a transmission, an accelerator, a brake, a differential device, and an axle. The charging portion 130 may store the electrical energy in the battery.

The charging portion 130 may include a base portion 131 and an inlet 132 protruding from the base portion 131. The inlet 132 may be connected to an outlet disposed on the charging station. The inlet 132 may be provided in a form of a plug.

The base portion 131 may form a body for the inlet 132 to be disposed in the charging portion 130.

The inlet 132 may include a plurality of connection terminals 133 therein. The plurality of connection terminals 133 may be an important component used as an intermediary in power charging in combination with an outlet disposed to the charging station.

Thus, it may be necessary that the inlet 132 and the outlet are correctly coupled.

The plurality of connection terminals 133 disposed in the inlet 132 may need to be maintained in a stable state at all times when connected to terminals of the outlet.

To this end, in the coupling of the inlet 132 and the outlet, a coupling groove is formed at side of the inlet 132, and a coupling protrusion is formed at one side of the outlet coupled to the coupling groove in a corresponding manner, and it is possible to use a method of mutually coupling the coupling groove and the coupling protrusion.

A portion of the base portion 131 corresponding to a portion where the plurality of connection terminals 133 are disposed may be penetrated for electronic connection for charging the battery of the vehicle 1.

Figure 5:
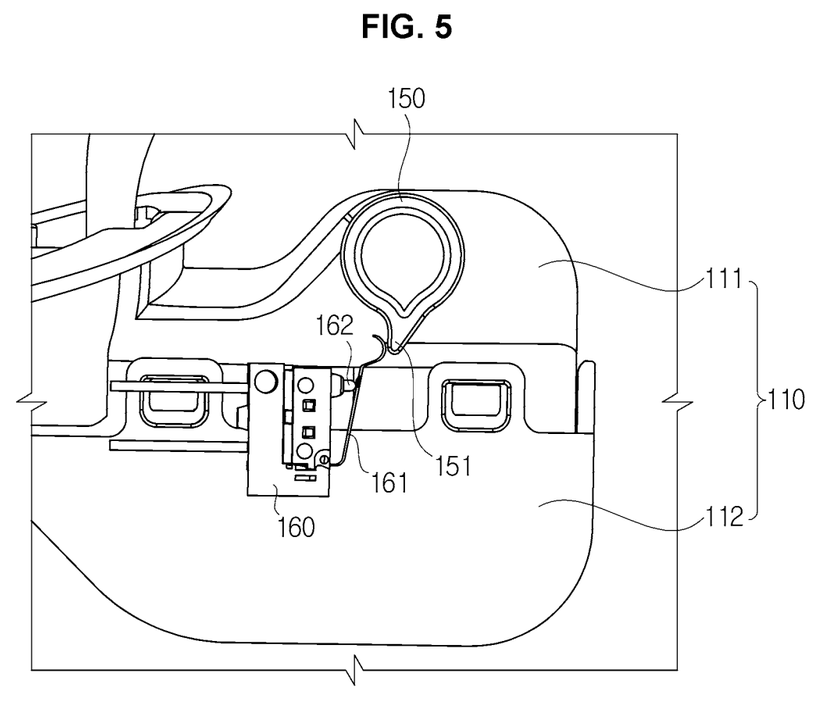
FIG. 5 is a view showing a hinge pin and a switch in a charging apparatus for a vehicle according to exemplary embodiments of the present invention.

FIG. 5 is a view showing a hinge pin 150 and a switch 160 in a charging apparatus 100 according to exemplary embodiments of the present invention.

As shown in FIG. 5, the charging apparatus 100 may include the hinge pin 150 inserted into the housing 110 and the switch 160 disposed to one side of the housing 110.

The hinge pin 150 may include an interference portion 151 disposed to a first side of the hinge pin 150 and configured to interfere with the switch 160. The cross section of the hinge pin 150 may be a substantially circular shape, and the interference portion 151 may protrude outward from the circular shape.

The switch 160 may include a push portion 161 disposed to one side of the switch 160 and configured to press an operation button 162 of the switch 160 by the interference portion 151.

The hinge pin 150 and the switch 160 may be disposed to one side of the housing 110 including the first housing 111 and the second housing 112 to form a region to accommodate the control device 270.

The hinge pin 150 may be rotated by the second cover 122 to connect the first cover 121 and the hinge pin 150 when the first cover 121 is opened. As the hinge pin 150 rotates, mutual interference may occur between the interference portion 151 and the push portion 161 by allowing the interference portion 151 to push the push portion 161.

The push portion 161 interfered by the interference portion 151 may operate the switch 160 by pressing the operation button 162 disposed to the external side of the switch 160. The indicator device 200 electronically connected to the switch 160 may function as the lighting by operation of the switch 160.

Figure 6:
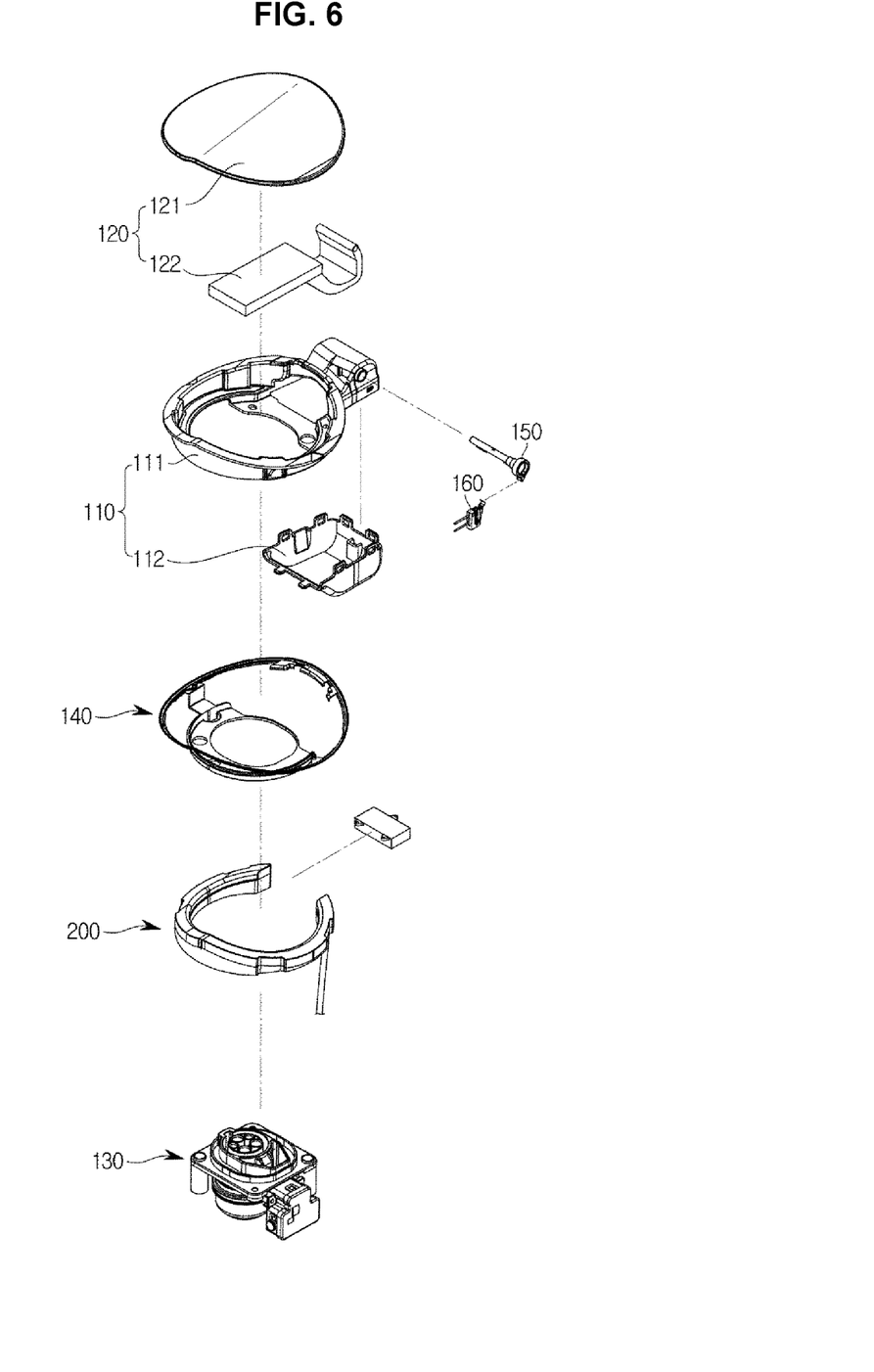
FIG. 6 is an exploded view of a charging apparatus for a vehicle according to exemplary embodiments of the present invention.

FIG. 6 is an exploded view of a charging apparatus for a vehicle according to exemplary embodiments of the present invention.

As shown in FIG. 6, the charging apparatus 100 may include the first cover 121 integrally formed with the vehicle body 10 and the second cover 122 mounted on the lower portion of the first cover 121.

The first housing 111 may be disposed to the lower portion of the second cover 122 and include the hinge pin 150. The second housing 112 may be coupled to the lower side of the first housing 111, and the louver 140 may be disposed between the cover 120 and the housing 110 to enhance the sealing force by the connection of the cover 120 and the housing 110.

The switch 160 may be disposed to externally on the housing 110 to interact with the hinge pin 150, and the indicator device 200 may be disposed internal the first housing 111.

The charging portion 130 may be inserted into the first housing 111 to be disposed near the indicator device 200. The charging portion 130 may be connected to the internal of the vehicle 1.

A detailed structure of the indicator device 200 is described below.

Figure 7:
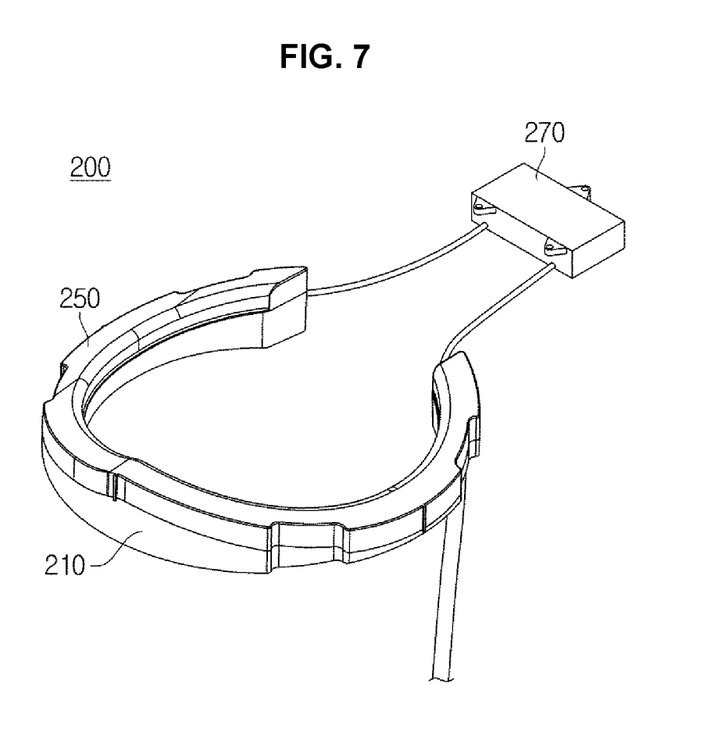
FIG. 7 is a perspective view of an indicator device in a charging apparatus for a vehicle according to exemplary embodiments of the present invention.

FIG. 7 is a perspective view of an indicator device in a charging apparatus for a vehicle according to exemplary embodiments of the present invention.

As shown in FIG. 7, the charging apparatus 100 may include the indicator device 200 configured to perform the lighting function.

The indicator device 200 may be disposed in the housing 110 and have an arc shape with both end portions distanced apart. However, the present invention is not limited thereto. The external shape of the indicator device 200 may be variously disposed to the extent that the indicator device 200 may be disposed in the housing 110.

The indicator device 200 may include a case 210 mounted to the housing 110 and a lens 250 coupled to the case 210. The indicator device 200 may receive an electrical signal by the control device 270.

The indicator device 200 may be illuminated when the switch 160 is turned on by opening the cover 120 and extinguished when the switch 160 is turned off by closing the cover 120.

When the operation button 162 of the switch 160 is pressed by the push portion 161, the indicator device 200 electronically connected to the switch 160 may emit the light as a whole.

The indicator device 200 may emit light of different colors, when the charging portion 130 is being charged and the charging of the charging portion 130 is completed. The control device 270 may control the illuminance, extinguishing, or blinking of the indicator device 200.

The control device 270 may control the illuminance of the indicator device 200 by the switch 160 interlocked with the opening or closing of the cover 120.

The indicator device 200 may emit the light, when the cover 120 is opened, and be illuminated in red, when the outlet is inserted into the inlet 132 and the vehicle 1 is being charged.

That is, the user may easily confirm that the battery disposed inside the vehicle 1 is being charged with the electric power, when the indicator device 200 is illuminated in red.

The indicator device 200 may be illuminated in green, when the charging of the vehicle 1 is completed. That is, the user may easily confirm that the battery disposed inside the vehicle 1 is fully charged with the electric power, when the indicator device 200 is illuminated in green.

The indicator device 200 may blink in green, when the charging of the vehicle 1 is reserved. Here, the blinking means that the indicator device 200 is illuminated and blinks.

That is, the user may easily confirm that the reserved charging is proceeding to the battery disposed inside the vehicle 1, when the indicator device 200 blinks in green.

The indicator device 200 may blink in red when the power is not being charged normally to the battery. That is, the indicator device 200 may blink in red, when a high voltage and other abnormalities occur during charging by allowing an outlet to be inserted into the inlet 132.

Accordingly, the user may rapidly cope with the situation, because the user may rapidly check the status of the abnormality during charging, when the indicator device 200 blinks in red.

The indicator device 200 may emit white light as a whole, when the battery is completely charged and the outlet is removed from the inlet 132, and be extinguished as a whole, when the cover 120 is closed.

Figure 8:
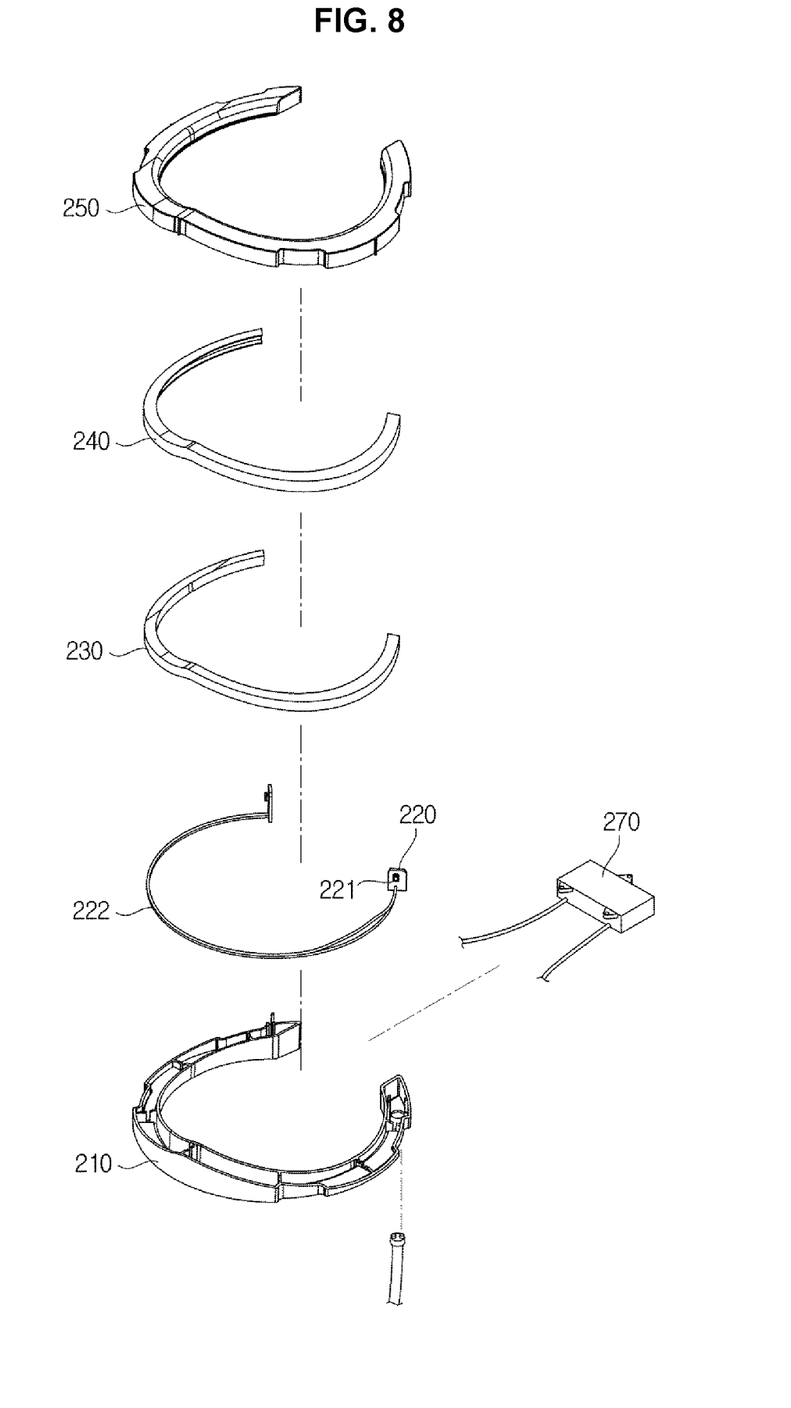
FIG. 8 is an exploded view of an indicator device in a charging apparatus for a vehicle according to exemplary embodiments of the present invention.

FIG. 8 is an exploded view of an indicator device in a charging apparatus for a vehicle according to exemplary embodiments of the present invention.

As shown in FIG. 8, the indicator device 200 may include the case 210 mounted on the first housing 111.

The indicator device 200 may include a PCB 220 having a light source 221 and a light guide plate 230 configured to guide the light emitted from the light source 221 and be accommodated inside the case 210. The PCB 220 may include the plurality of PCBs, and the plurality of PCBs may be electronically connected to each other by a wire 222.

The indicator device 200 may include a reflection plate 240 configured to reflect the light through the light guide plate 230, and the lens 250 coupled to the case 210 forming an accommodating region 260 to accommodate the light guide plate 230 and the reflection plate 240.

The PCB 220 may be disposed between the case 210 and the light guide plate 230, and the reflection plate 240 may be disposed between the light guide plate 230 and the lens 250. The PCB 220 may receive the electrical signal by the control device 270.

Figure 9:
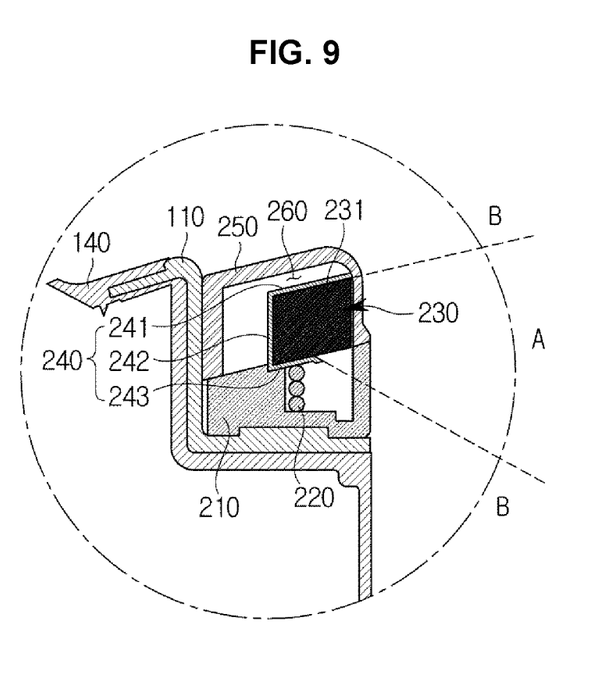
FIG. 9 is a side cross-sectional view of an indicator device in a charging apparatus for a vehicle according to exemplary embodiments of the present invention.

FIG. 9 is a side cross-sectional view of an indicator device in a charging apparatus for a vehicle according to exemplary embodiments of the present invention.

As shown in FIG. 9, the housing 110 may be coupled to the louver 140, and the case 210 may be mounted to the housing 110.

The PCB 220 having the light source 221 may be accommodated in the internal region of the case 210, and the light guide plate 230 may be disposed on an upper portion of the PCB 220. The light guide plate 230 may include a pattern 231 formed on a surface of the light guide plate 230 wherein the light incident from the light source 221 is uniformly transmitted.

The pattern 231 may be formed as an optical pattern on a side surface and a back surface of the light guide plate 230, but is not limited thereto.

The light guide plate 230 may minimize the loss of the light incident from the light source 221 and enlarge the point light source to the surface light source by use of the principle of total reflection and diffuse reflection.

The reflection plate 240 may minimize the loss of the light guided from the light guide plate 230 and covers a portion of the light guide plate 230 so that a lighting area A and a non-lighting area B are separated.

The reflection plate 240 may improve the final luminance of the lighting area A and cover an upper surface, an external side surface and a portion of a lower surface of the light guide plate 230 so that the non-lighting area B is partitioned.

That is, the reflection plate 240 may include a first reflection plate 241 disposed to the upper portion of the light guide plate 230, a second reflection plate 242 disposed to the external side surface of the light guide plate 230 and bent from the first reflection plate 241, and a third reflection plate 243 disposed to the lower portion of the light guide plate 230 and bent from the second reflector 242.

The reflection plate 240 may be in contact with the light guide plate 230, the third reflection plate 243 may cover a portion of the lower portion of the light guide plate 230, and a length of the third reflection plate 243 may be shorter than a length of the first reflector 241.

The above is to allow the reflection plate 240 to not interfere with a portion of the lower portion of the light guide plate 230 to transmit the light emitted from the light source 221 to the portion where the inlet 132 inserted to the outlet is disposed, as well as the internal surface of the light guide plate 230.

The lens 250 and the case 210 may be formed into a watertight structure by ultrasonic welding wherein the accommodating region 260 formed inside the lens 250 and the case 210 is waterproof. Accordingly, the indicator device 200 may be configured as a separate module and mounted on the housing 110.

The internal of the accommodating region 260 may be filled with air.

The lens 250 may be matched to the charging portion 130 without being distinguished from the charging portion 130 in a 'black smog', when the light source 221 is extinguished, and realize more complete light emission by the diffusion function of the light diffusing agent mixed resin, when the light source 221 is illuminated.

Figure 10:
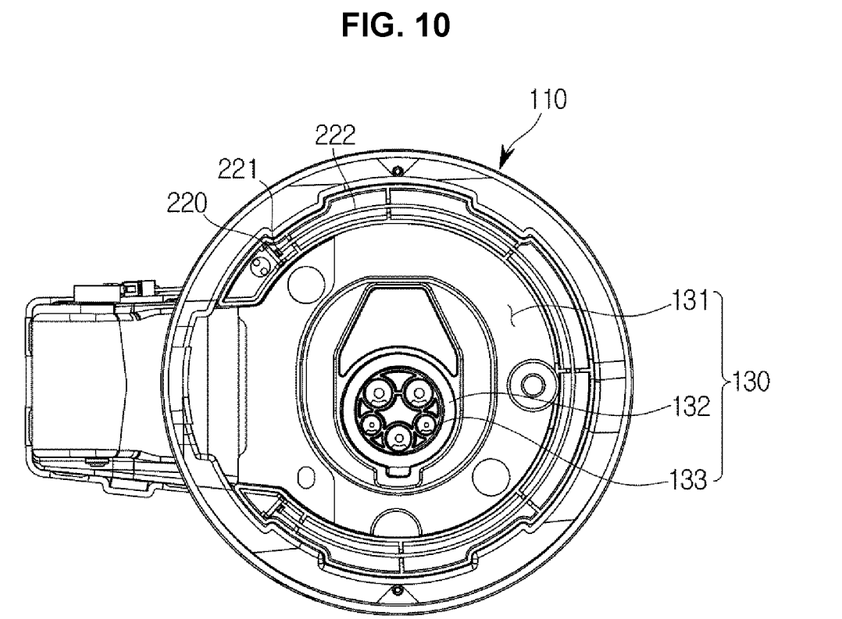
FIG. 10 is a view showing a PCB including a light source in a charging apparatus for a vehicle according to exemplary embodiments of the present invention.

FIG. 10 is a view showing a PCB including a light source in a charging apparatus for a vehicle according to exemplary embodiments of the present invention.

As shown in FIG. 10, the indicator device 200 may be disposed to cover the charging portion 130 and be distanced apart from the charging portion 130.

The light source 221 may include a plurality of light sources, and the plurality of light sources may be disposed in two and disposed at both end portions of the PCB 220, respectively. When the light sources 221 are disposed in two at both end portions of the PCB 220, the two light sources 221 may be connected by the wire 222 and disposed in the housing 110.

The light source 221 may include a light emitting diode (LED, 221'). However, the present invention is not limited thereto, and the position, type, and number of the light source 221 may be variously provided according to the degree of brightness of light of the indicator device 200.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A charging apparatus for a vehicle, the apparatus comprising:
   a housing accommodating a charging portion;
   a case mounted to the housing;
   a Printed Circuit Board (PCB) disposed inside the case and having a light source;
   a light guide plate guiding a light emitted from the light source;
   a reflection plate reflecting the light through the light guide plate;
   a lens coupled to the case, the lens and case forming a region for accommodating the light guide plate and the reflection plate in the lens and case; and
   a cover hinged to the housing to open or close the housing.

2. The charging apparatus for the vehicle according to claim 1, further including:
   a switch disposed in the housing to transmit an electrical signal to the PCB, and
   a hinge pin inserted into the housing to turn on or off the switch by being interlocked with the opening or closing of the cover.

3. The charging apparatus for the vehicle according to claim 2, wherein the hinge pin includes an interference portion disposed to a first side of the hinge pin to interfere with the switch, and
   wherein the switch includes a push portion disposed to a first side of the switch to press an operation button of the switch by the interference portion.

4. The charging apparatus for the vehicle according to claim 2, wherein the light source is illuminated when the switch is turned on by opening the cover, and is extinguished when the switch is turned off by closing the cover.

5. The charging apparatus for the vehicle according to claim 1, wherein, when the charging portion is being charged and the charging of the charging portion is completed, a color of the light source is differently emitted.

6. The charging apparatus for the vehicle according to claim 1, wherein, when an abnormality occurs in the charging of the charging portion, the light source is blinked.

7. The charging apparatus for the vehicle according to claim 1, wherein the light guide plate includes a pattern formed on a surface of the light guide plate so that the light incident from the light source is uniformly transmitted.

8. The charging apparatus for the vehicle according to claim 1, wherein the reflection plate covers a portion of the light guide plate so that a lighting area and a non-lighting area are separated.

9. The charging apparatus for the vehicle according to claim 8, wherein the reflection plate covers an upper surface, an external side surface and a portion of a lower surface of the light guide plate so that the non-lighting area is partitioned.

10. The charging apparatus for the vehicle according to claim 1, wherein the lens includes a light diffusing agent mixed resin.

11. The charging apparatus for the vehicle according to claim 1, wherein the lens and the case are coupled by ultrasonic welding configured to waterproof the accommodating region inside the lens and the case formed by the lens and the case.

12. The charging apparatus for the vehicle according to claim 1, wherein the lens is disposed to cover the charging portion and is distanced apart from the charging portion.

13. The charging apparatus for the vehicle according to claim 1, wherein the light source includes a plurality of LED light sources disposed at first and second end portions of the PCB.

14. A charging apparatus for a vehicle, the apparatus comprising:
    a cover hinged to a housing;
    an indicator device having an arc shape with first and second end portions separated apart and disposed in the housing;
    a switch configured to transmit an electrical signal to the indicator device wherein the indicator device performs a lighting function; and
    a hinge pin configured to emit a light of the indicator device by turning on the switch and being interlocked with opening of the cover,
    wherein the indicator device includes,
    a light source configured to emit the light of different colors depending on when the vehicle is being charged and when the charging of the vehicle is completed, and
    a lens configured to protect the light source.

15. The charging apparatus for the vehicle according to claim 14, wherein the indicator device further includes:
    a light guide plate including a pattern formed on a surface of the light guide plate to uniformly guide the light emitted from the light source, and
    a reflection plate configured to cover a portion of the light guide plate to partition a lighting area which the light through the light guide plate reaches.

16. The charging apparatus for the vehicle according to claim 15, wherein the reflection plate is disposed between the light guide plate and the lens.

17. The charging apparatus for the vehicle according to claim 16, wherein
    the lens is coupled to a case, and the lens and the case include a region for accommodating the light guide plate and the reflection plate in the lens and the case.

18. The charging apparatus for the vehicle according to claim 1, wherein the reflection plate is disposed between the light guide plate and the lens.

* * * * *